Jan. 17, 1967     H. KRAMER     3,298,426
WEBBING-STRIP FASTENERS
Filed Feb. 9, 1966
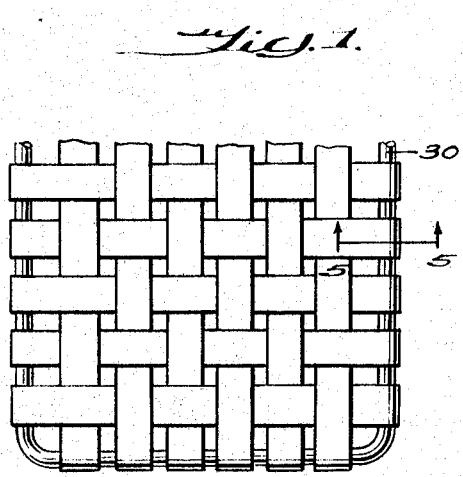
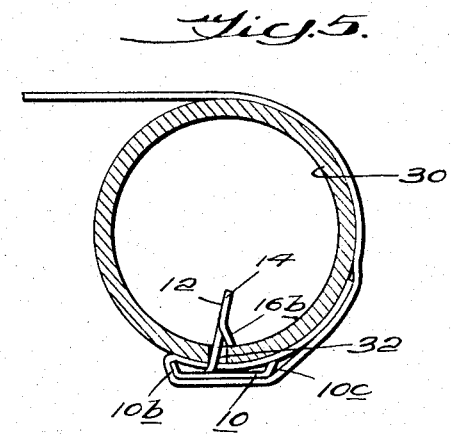
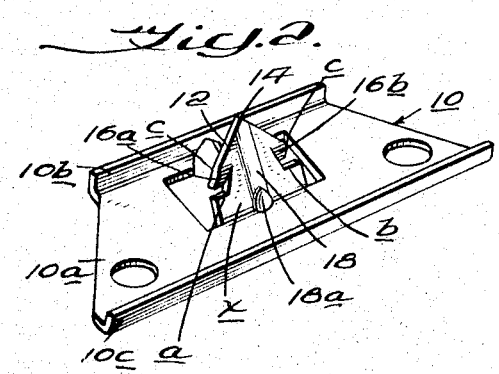
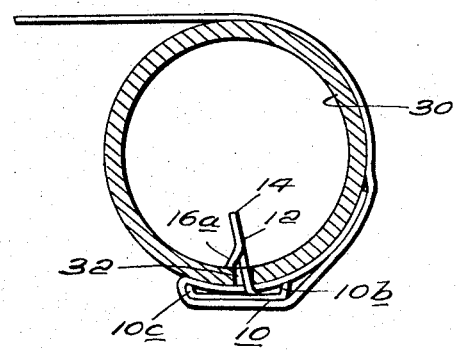
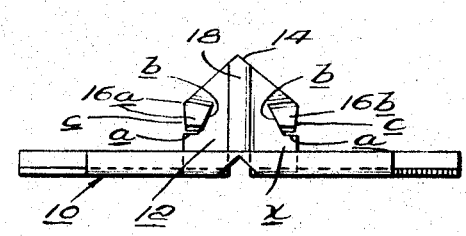
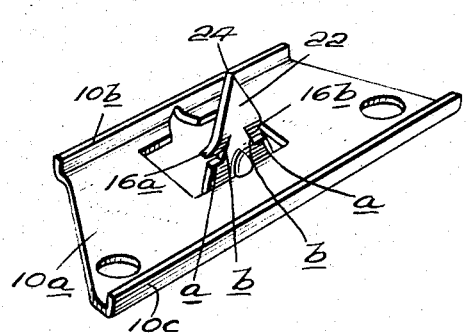
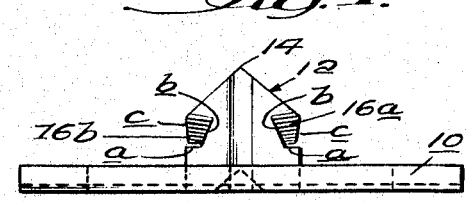
INVENTOR
HYMAN KRAMER,
BY J. Harold Kilcoyne
ATTORNEY

United States Patent Office 3,298,426
Patented Jan. 17, 1967

3,298,426
WEBBING-STRIP FASTENERS
Hyman Kramer, 2764 E. 16th St., Brooklyn, N.Y. 11235
Filed Feb. 9, 1966, Ser. No. 526,186
5 Claims. (Cl. 160—404)

This invention relates to improvements in webbing-strip fasteners and more particularly to an improved webbing-strip fastener of the type generally disclosed and claimed in my prior Patent No. 3,042,113, dated July 3, 1962, the present application for Letters Patent thereon being a continuation-in-part of my application Ser. No. 325,413, filed November 21, 1963, now abandoned.

Webbing strip fasteners according to my aforesaid Patent No. 3,042,113 have proved themselves commercially, and are now being used on an ever-increasing scale, and are giving excellent service. However, continuing experience with such a fastener has given rise to the suggestion that the vertical leg or prong portion of the fastener might be strengthened in manner as to provide the fastener with a factor of safety against failure when used in those applications wherein the webbing strip secured thereby is or may be called upon to sustain greater than usual weights or loads.

Generally speaking, since failure of a fastener according to my Patent No. 3,042,113 is likely to occur only in the relatively narrow neck portion of the fastener leg or prong which connects the arrowhead-shaped point of said leg or prong to the fastener head part, it is a major object of the invention to provide a webbing-strip fastener possessing all of the advantages of the patented fastener and which is further characterized by an improved design of leg part or prong which eliminates the possibility of failure thereof when the fastener is employed to secure webbing strips subjected to exceptionally great loads or weights.

A more particular object of the invention is the provision of an improved T-clip form of webbing strip-to-tubular frame member fastener of the general type disclosed and claimed in my aforesaid Patent No. 3,042,-113 but whose leg or prong is substantially more rugged and resistant to deformation, bending, etc. under strain, thus to render the fastener capable of use in those exceptional webbing-strip fastener applications requiring a heavy-duty fastener.

Another object of the invention is the provision of a press- or push-in type of webbing strip-to-tubular frame member fastener as aforesaid, characterized by the fastener leg or prong having locking barbs or lances struck out from full-width side edge areas of said prong, and wherein said locking barbs are further so constructed and arranged as to possess great holding power and concomitant resistance to collapse under heavy loads applied to the webbing strip fastener thereby, which in turn permits the use of thinner guage steel in fastener fabrication than heretofore considered possible.

Still another object of the invention is the provision of a webbing strip-to-tubular frame member fastener of the last stated character, wherein the locking barbs are so angled with respect to the longitudinal center line and general plane of the fastener leg or prong as endows them with increased locking power, while at the same time rendering them more flexible, thus making the fastener easier to assemble and the assembly operation less damaging to the edge of the slots in the tubular frame member provided for the reception of the fastener prong, than so-called square-cut locking barbs or lances.

The above and other objects and features of advantage of the improved fastener (or fastener clip) according to the present invention will be set forth in or appear from the following detailed description thereof, taken with the accompanying illustrative drawing, wherein—

FIG. 1 is a fragmentary view of a seat (or back) of a piece of tubular-frame furniture fashioned from interlaced fabric or plastic-material webbing strips extending between and secured adjacent their opposite end portions to the spaced parallel frame members thereof as by a plurality of the improved fastener clips of the invention;

FIG. 2 is an enlarged perspective view of one of said fastener clips as viewed from beneath the head part thereof;

FIGS. 3 and 4 are front and rear elevational views, also on an enlarged scale, which illustrate the feature of the angling of the locking barbs with respect to the center line of the fastener prong;

FIG. 5 is a section taken along line 5—5 of FIG. 1, which illustrates a webbing strip-to-tubular frame member fastening achieved by a fastener of the clip of the invention;

FIG. 6 is a view similar to FIG. 5, illustrating that the fastener clip is equally functional when turned 180° from its FIG. 5 position; and FIG. 7 is a perspective view corresponding to FIG. 2 of a fastener having somewhat modified configuration of fastener leg part or prong than that shown in the lower numbered view.

Referring to the drawings in greater detail, a fastener or fastener clip of the invention, like that of the fastener clip of my aforesaid Patent No. 3,042,113, has general T-form when viewed from both its front and ends. More particularly, it comprises an elongated head part 10 and an integral leg part or prong 12 having substantially lesser width than the length of said head part and which depends from the longitudinal mid-portion of the latter and terminates in a point 14. Illustratively, the head part 10 has width which is substantially wider than the leg part or prong, thus enabling said leg part or prong to be struck out completely or substantially completely from the central portion of said head part. Preferably also, the head part 10, rather than being formed flat and in the same plane throughout its full area, instead has shallow channel section providing it with a long and wide central flat portion 10a and longitudinal edge flanges 10b, 10c extending substantially at a right angle therefrom in the direction of the prong, which also has substantially right-angular relationship to said central flat portion. Finally, the overall width of said head part portion 10a and the extent of projection of the side-edge flanges 10b, 10c therefrom by design are such that if the fastener were assembled directly to a tubular frame member, such as that designated 30 in FIGS. 5 and 6, its head part 10 would make contact with the periphery of said frame member only along the longitudinal edges of the side-edge flanges 10b, 10c, which is another way of saying that the under face of the flat central head portion 10a would not make contact with the periphery of the frame member but instead would be spaced a small distance therefrom.

Still relating the present fastener clip with that of my aforesaid Patent No. 3,042,113, the fastener leg part or prong of the instant fastener clip is also provided with locking barbs or "lances" designated 16a, 16b which incline relatively upwardly-laterally by a small angle from the general plane of said leg part or prong so that their working edges, i.e. their free edges which are disposed towards the under side of the fastener head part 10, are displaced or offset to one side of the general plane of said part or prong. As explained in said patent, when the pointed end of the leg part or prong is forcibly inserted in a slot-like opening such as that designated 32 (FIG. 5) provided therefor in the aforementioned tubular frame member 30 during the intended assembly therewith, said locking barbs 16a, 16b, which are by design offset from the plane of the fastener leg part or prong in which they are formed a distance which may be and preferably is slightly greater than the width of said slot, will flex relatively inwardly or toward said leg part in moving through the slot and then will spring back to their fully offset relationship upon having cleared said slot. When the latter takes place and assuming that the working edges of said locking barbs are properly located lengthwise of the leg part or prong carrying same, said working edges will engage against the inner wall surface of the frame member adjacent the slot, thus securely self-locking the fastener clip to the tubular frame member.

An important feature of the fastener clip of the present invention which distinguishes it from that of my aforesaid patent resides in the construction of the leg part or prong 12 thereof. More particularly, whereas the leg-part of the patented clip incorporates a narrow-width neck portion connecting the arrow head-shaped point of said leg part or prong to the head part, the leg part or prong of the instant fastener is devoid of this narrow-width neck and instead provides that the root or body portion of the leg part has the same full width as that of the arrowhead point. This of course results in the root or body portion of the fastener leg or prong 12 (which is designated X in FIGS. 2 and 3 for clarity) having substantially greater strength and rigidity and thereby resistance to being bent or deformed in use than the fastener leg having a narrow-width neck portion between its pointed end portion and the fastener head part.

It is also a feature of the invention that the aforesaid locking barbs 16a, 16b are struck out from corresponding opposite side-edge areas of the leg part or prong 12 which are spaced from the under side of the head part 10 in the direction of the prong point, as is shown in FIGS. 2–4 inclusive, preferably in a stamping out operation which also effects inclining of the barbs from the general plane of said leg part as aforesaid. This is of course made possible by the increased width of the root or body portion of the leg part of the herein fastener which provides the necessary areas for the respective barbs, in contrast to the narrow-width neck portion of the leg part or prong of the fastener according to my aforesaid Patent No. 3,042,113.

According to a further important feature of the present invention, the aforesaid barbs 16a, 16b are struck or cut out from the prong along lines of severance and thereupon so shaped that in final form they are angled both to the vertical center line and to the plane of the prong which they serve to lock. More particularly, and as is best seen in FIGS. 3 and 4, said barbs are defined by relatively upper lines of cut or severance designated a, a, which extend inwardly from the side edges of the prong at a right angle to the prong center line and by inner lines of cut designated b, b which extend downwardly to about the beginning of the point area of the prong and which, rather than running parallel to said prong center line, as would result in a so-called square-cut barb, are inclined thereto by an angle of approximately 30° and which furthermore converge towards one another with the result that said barbs have greatest width at their lower or prong-connected ends. By this arrangement, when the barbs are inclined out of the plane of the prong, they tend to curl towards one another about axes extending vertically through said barbs, as results in their outer edges c, c being disposed a greater distance out of the general plane of the prong than are the inner edges of the barbs.

The net results of this unique angling and shaping of the locking barbs are that they are much more resistant to buckling and/or collapse under load than if they were square cut, i.e. defined by right-angularly related lines of cut or severance. Moreover, since angled barbs have less bearing on the edges of the slot in the tubular frame member provided for the reception of the prong carrying same, the prong characterized by the angled and curled barbs of the present invention are very easy to insert and furthermore do not appreciably damage the slot during insertion. Finally but most importantly, because of the substantially increased resistance of locking barbs according to the invention to buckling, webbing strip fasteners incorporating same may be made from a lighter-gauge steel which is both less expensive and more flexible than the steel employed for the fasteners whose locking barbs are of the right-angular or square-cut type.

As can be seen in FIGS. 3 and 4, either during or subsequent to the operation of stamping out the fastener leg part or prong 12 from the head part 10, a strengthening rib 18 extending along its vertical center line and terminating in V notch 18a at the juncture of the fastener head and prong is coined or otherwise provided in said prong. Of course, other and/or additional means for strengthening the body of the prong or its line of connection with the head of the herein fastener may be supplied as considered necessary for a particular fastener application.

Whereas the side edges of the body or root portion of the fastener leg part or prong 12 are disposed parallel to one another according to the form of fastener illustrated in FIGS. 2–4, they may instead be inclined to one another by the same angle of inclination as that of the side edges of the pointed end designated 24. Such modified configuration of leg part or prong is shown in FIG. 7, which illustrates that the entire leg part (designated 22) may have the configuration of a wide-base isosceles triangle when viewed as in that figure, with the locking barbs 16a, 16b being struck out from the oppositely inclined and converging side edges thereof and angled with respect thereto, just as with the FIGS. 2–4 form.

Webbing strip fastener clips of the present invention may be assembled to the webbing strip ends which they are to secure and thence to the tubular frame members of a seat or back element of a piece of furniture as shown in FIG. 1, exactly as illustrated and described in my aforesaid Patent No. 3,042,113, so that no further description of the assembly operations is necessary for an understanding of the present invention. Suffice it to say that two fasteners are preassembled to each webbing strip to be finally assembled at points set back a small distance from the ends thereof as permits the end portions of the webbing strip forming a partial inner wrap on the frame member when the webbing strip is assembled thereto, as in FIGS. 5 and 6. This latter assembly of course contemplates the pushing of the pointed ends of the fastener leg parts or prongs through the slot-like openings 32 provided therefor in the tubular frame member 30, and finally the completion of the locking action of the locking barbs 16a, 16b with respect to the inner wall surfaces of said frame members which extend along said opening, also as shown in FIGS. 5 and 6. This locking action assumes that the working edges of the locking barbs will be spaced from the under surface of the longitudinal central section 10a of the fastener head part a distance substantially equal to the total of the thickness of the wall of the tubular frame member, the thickness of the partial inner wrap which the webbing strip makes about said frame member and the spacing of said longitudinal central section 10a from the periphery of said frame member resulting from the fastener head part making line contact therewith only along its longitudinal side edges.

FIGS. 5 and 6 illustrate a further practical feature of a fastener according to the invention; namely, that it is a reversible as respects the direction in which the locking barbs 16a, 16b incline or face. In explanation, FIG. 5 shows said barbs as being offset or inclining to the right side of the fastener leg part or prong, whereas FIG. 6 shows the locking barbs inclining towards the left side of said leg part or prong. In practical effect, this means that persons or machines engaged in preassembling the fasteners to the webbing strip ends and/or in completing the final assembly operation are under no requirement of picking up or having presented to them fasteners faced in a particular direction, since the fasteners are fully operative regardless of the right- or left-hand disposition or facing of the locking barbs.

As many changes could be made in carrying out the above constructions without departing from the scope of the invention, it is intended that all matter contained in the above description or shown in the accompanying drawing shall be interpreted as illustrative and not in a limiting sense.

I claim:

1. For use in securing webbing strips to the tubular frame members of tubular frame furniture and the like, a fastener comprising an elongated head part having length corresponding generally to the width of the webbing strip to be secured thereby and an integral prong-like leg part depending from the middle-length portion of said head part and terminating in a point facilitating its being assembled first to the webbing strip and thence to the frame member by being projected through an opening thereof, said leg part in its root portion which connects it to the head part having width at least as great as the greatest width of its pointed end portion, and locking barbs struck out from corresponding opposite areas of side edge portions of the leg part which are disposed intermediate said root portion and said point and being defined by lines of severance from the leg part proper which extend inwardly from the leg-part side edges at a right angle to the leg-part center line and thence downwardly towards the leg-part point at angles of approximately 30° from said center line, said locking barbs being inclined out of the plane of said leg part so as to define working edges which are disposed towards the under side of the head part and are spaced from said under side a distance slightly greater than the thickness of the wall of the tubular frame member, the construction and arrangement being such that the working edges of said barbs initially serve to secure the fastener to a webbing strip when preassembled thereto and upon final assembly of the fastener with the frame member to secure the fastener and webbing strip to said frame member by their interlocking engagement against the inner wall of said frame member which extends along said opening.

2. A fastener according to claim 1, wherein said barbs are bent towards one another in addition to being inclined out of the plane of the leg part.

3. For use in securing webbing strips to the tubular frame members of tubular frame furniture and the like, a fastener comprising an elongated head part having length corresponding generally to the width of the webbing strip to be secured thereby and an integral prong-like leg part depending from the middle-length portion of said head part and terminating in a point facilitating its being assembled first to a webbing strip end portion and thence to the frame by being projected through an opening thereof, said leg part including locking barbs struck out from corresponding opposite areas of its side edge portions, said barbs being defined by upper edge lines which are spaced from the under side of the head part a distance slightly greater than the thickness of the wall of the tubular frame member and extend inwardly and at a right angle to the longitudinal center line of the leg part and by inner edge lines which converge towards one another at angles of approximately 30° from said center line, and said barbs being inclined out of the plane of said leg part and turned slightly towards one another so that when the prong is being projected through the opening in the frame member the barbs make only line contact with the edge of said opening against which they engage.

4. A fastener according to claim 3, wherein said head part has a shallow channel section and is disposed so that the channel opens towards the point of the prong, the width of the head part and the depth of the channel being such that the head part is adapted to bear on the webbing strip end portion which it fastens along only substantially its longitudinal side edges.

5. For use in securing webbing strips to the tubular frame members of tubular frame furniture and the like, a fastening comprising an elongated head part having length corresponding generally to the width of the webbing strip to be secured thereby and an integral prong-like leg part depending from the middle length portion of said head part and terminating in a point facilitating its being assembled first to the webbing strip and thence to the frame member by being projected through an opening thereof, said head part having a shallow channel section and being disposed so that the channel opens towards the point of the prong, the width of the head part and the depth of the channel being such that the head part is adapted to bear on the webbing strip end portion which it fastens along only substantially its longitudinal side edges, said leg part in its root portion which connects it to the head part having width at least as great as the greatest width of its pointed end portion, and locking barbs struck out from corresponding opposite areas of said edge portions of the leg part which are disposed intermediate said root portion and said point and being inclined out of the plane of said leg part so as to define working edges which are disposed towards the under side of the head part and are spaced from said under side a distance slightly greater than the thickness of the wall of the tubular frame member, the construction and arrangement being such that the working edges of said barbs initially serve to secure the fastener to a webbing strip when preassembled thereto and upon final assembly of the fastener with the frame member to secure the fastener and webbing strip to said frame member by their interlocking engagement against the inner wall of said frame member which extends along said opening.

References Cited by the Examiner

UNITED STATES PATENTS

| | | | |
|---|---|---|---|
| 679,104 | 7/1901 | Brooks | 292—320 |
| 2,817,392 | 12/1957 | Thomas | 160—398 |
| 2,974,721 | 3/1961 | Thomas. | |
| 3,042,113 | 7/1962 | Kramer | 160—404 |
| 3,092,177 | 6/1963 | Kramer | 160—404 |

HARRISON R. MOSELEY, *Primary Examiner.*

P. C. KANNAN, *Assistant Examiner.*